R. L. DAILEY.
COMBINED WHEEL DRIVE AND GUIDE MECHANISM FOR MOTOR CARS.
APPLICATION FILED AUG. 9, 1915.
1,175,242.
Patented Mar. 14, 1916.
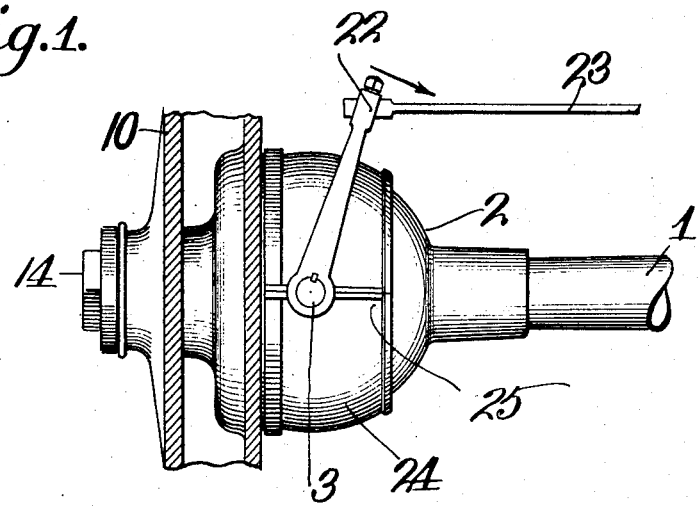
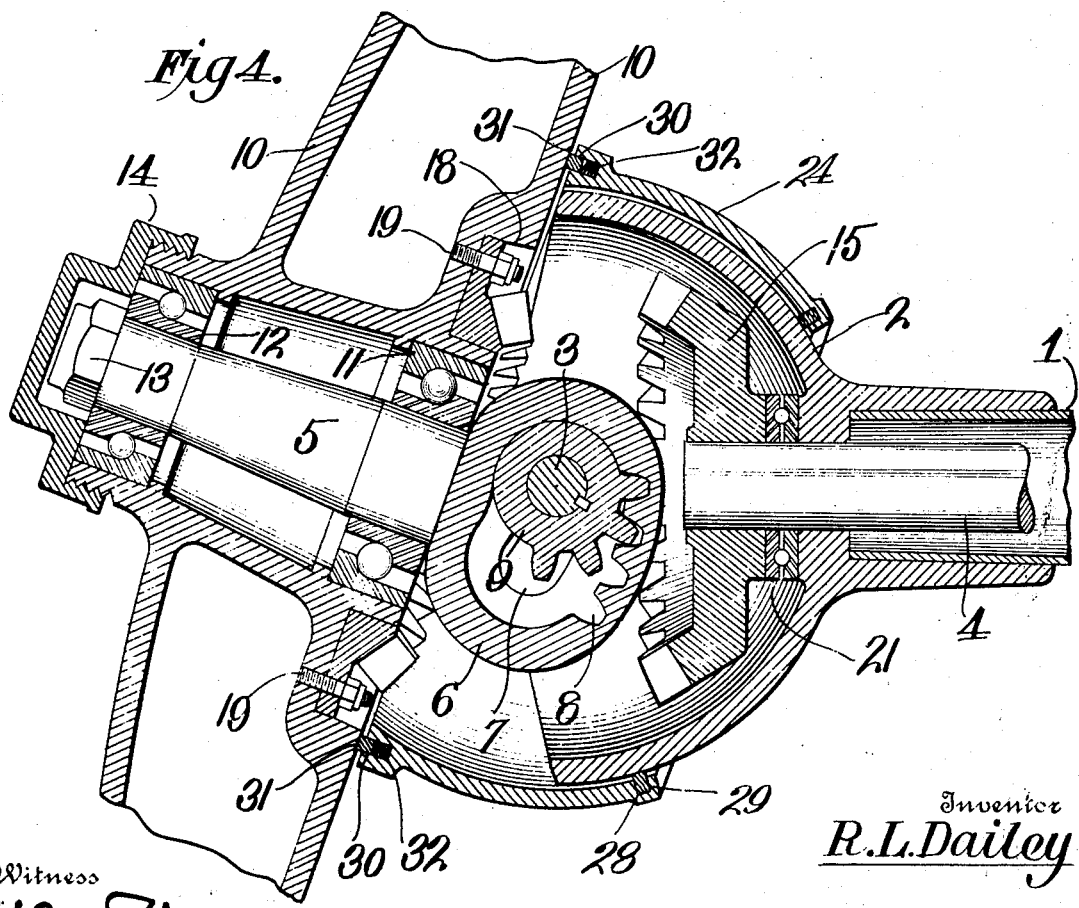
Witness
K. M. Thorpe
Frank R. Glore
Inventor
R. L. Dailey
By George Thorpe
Attorney

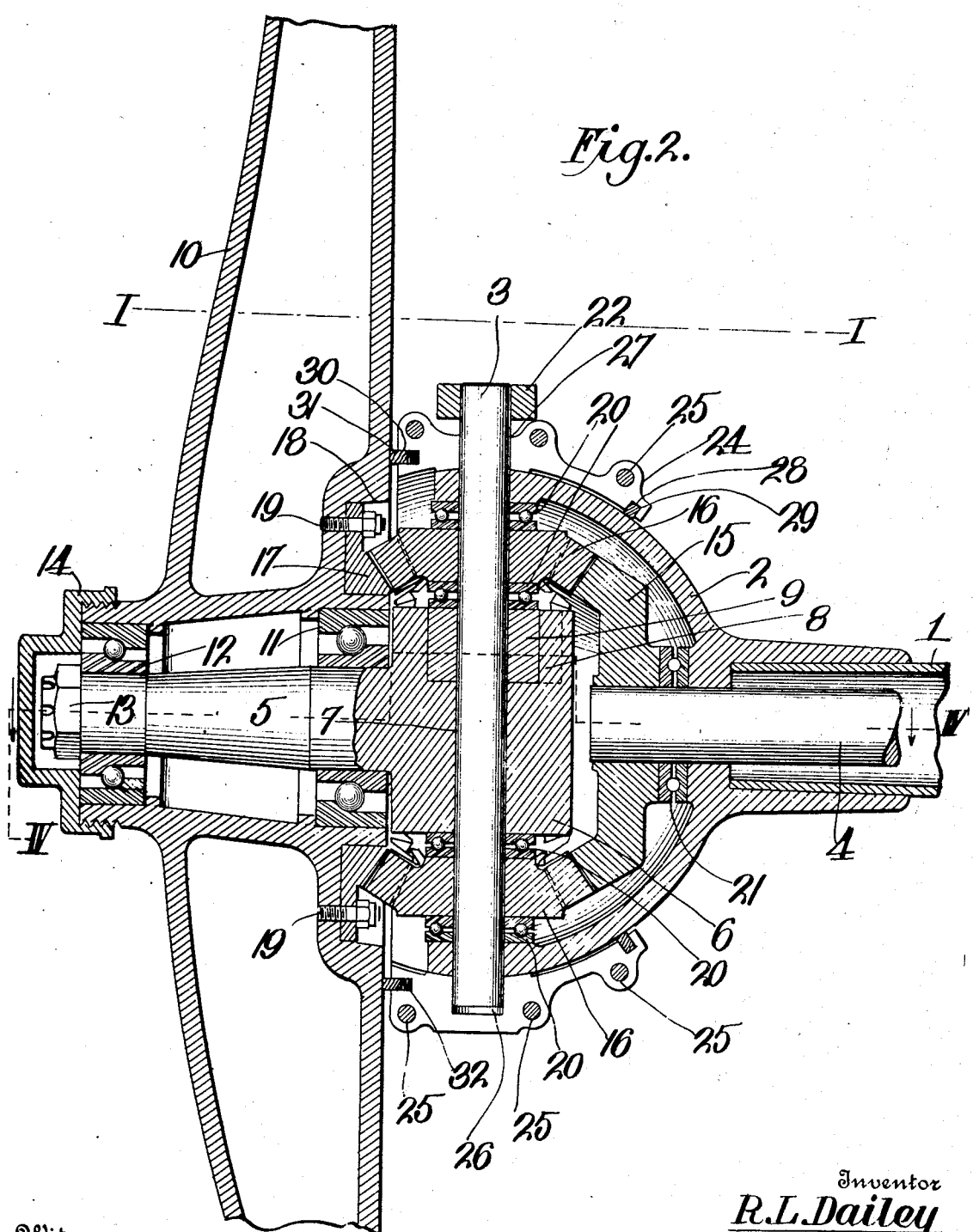

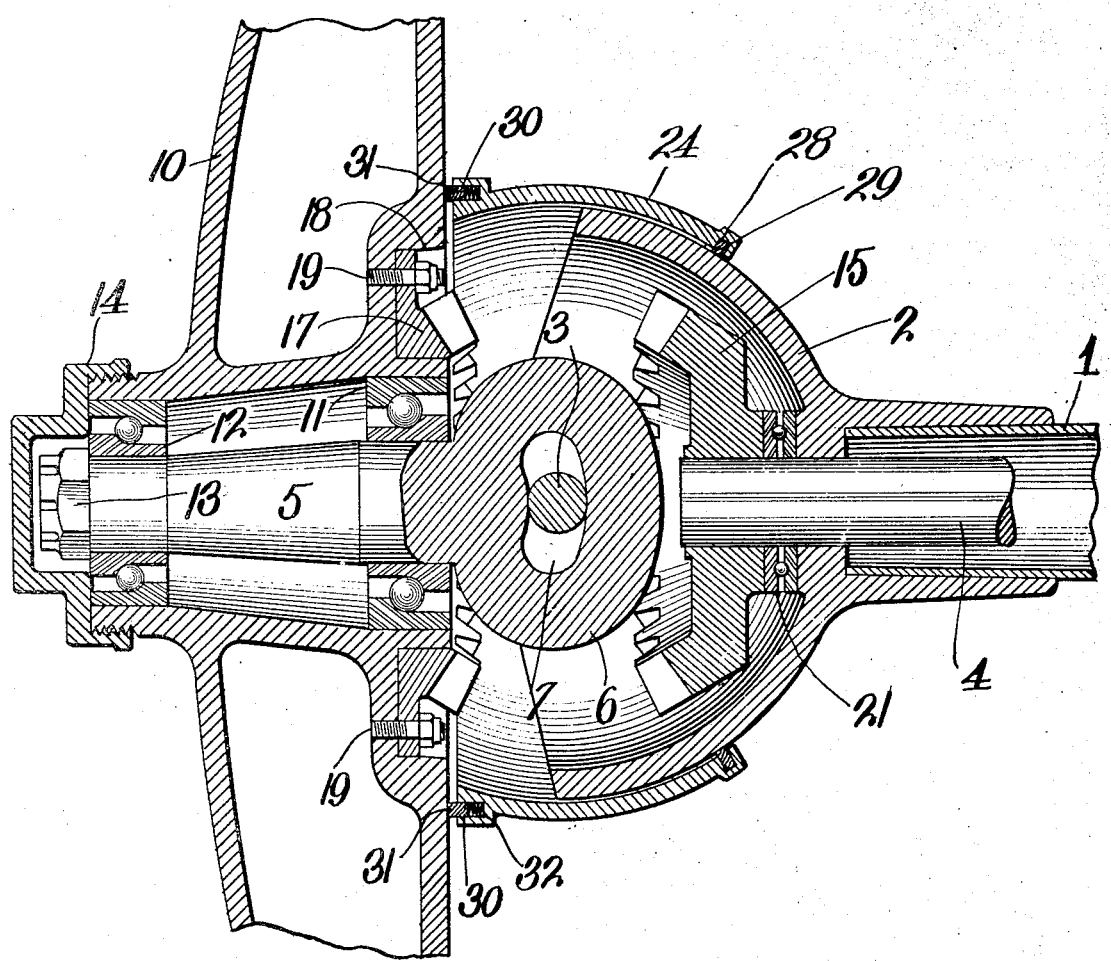

UNITED STATES PATENT OFFICE.

RUSSELL LEE DAILEY, OF KANSAS CITY, MISSOURI.

COMBINED WHEEL DRIVE AND GUIDE MECHANISM FOR MOTOR-CARS.

1,175,242. Specification of Letters Patent. Patented Mar. 14, 1916.

Application filed August 9, 1915. Serial No. 44,643.

*To all whom it may concern:*

Be it known that I, RUSSELL L. DAILEY, a citizen of the United States, residing at Kansas City, in the county of Jackson and State of Missouri, have invented certain new and useful Improvements in Combined Wheel Drive and Guide Mechanism for Motor-Cars, of which the following is a specification.

This invention relates to combined wheel drive and guide mechanism for motor car trucks and the like, where it is desirable to drive all four wheels, and my object is to produce a mechanism of this character which operates efficiently, by which lubricant is retained and from which dust and dirt are excluded.

With this general object in view the invention consists in certain novel and peculiar features of construction and combinations of parts as hereinafter described and claimed; and in order that it may be fully understood reference is to be had to the accompanying drawings, in which:

Figure 1, is a horizontal section on the line I—I of Fig. 2. Fig. 2, is a central vertical section of the combined wheel and drive mechanism. Fig. 3, is a central horizontal section of the same. Fig. 4, is a horizontal section taken on the line IV—IV of Fig. 2, but showing the wheel turned.

Referring to the drawings in detail, 1 indicates an axle housing, in this instance the housing for the front axle of a car, and secured upon the end of said housing is a substantially hemispherical cup 2. 3 is a vertical pivot pin extending diametrically through said cup in the vertical plane of the drive axle 4, and outward of the same, the said axle projecting from the housing into said cup.

5 is a spindle provided at its inner end with an enlargement or head 6 located within the cup, and said head is provided with a curved slot 7 through which the pivot pin 3 extends. At its upper end the head 6 is provided inward of said slot with a segmental series of gear teeth 8 which teeth are preferably formed on the inner side of a wall produced by recessing the upper end of said head for the accommodation of a segment gear 9 rigidly secured on the pivot pin and intergeared with gear teeth 8, the said recess constituting an enlargement for and at the upper end of slot 7, so that the head of the spindle shall be capable of swinging movement with respect to the pivot pin.

A road wheel 10 is fitted over spindle 5 upon ball bearings 11 secured upon the spindle adjacent the head of the latter and upon a similar bearing 12 secured upon the outer end of the spindle, and secured upon the outer extremity of the latter is a nut 13 which guards against dislocation of the outer bearing and the wheel, and to make the connection between the spindle and the wheel dust and oil proof, a cap 14 is screwed upon the outer end of the hub of the wheel.

Secured rigidly on the end of shaft 4 within the cup 2, is a beveled gear wheel 15, meshing with a pair of beveled gear wheels 16 journaled upon pivot pin 3 above and below the head of the spindle 5, and said gear wheels 16 also mesh with a beveled gear wheel 17 set in a recess 18 in the inner side of wheel 10, and rigidly secured to the latter by bolts 19 as shown or in any other suitable manner. Suitable thrust bearings 20 are interposed between the beveled gears 16 and the cup, and between the former and segmental gear 9 and spindle head 6. A similar thrust bearing 21 is interposed between beveled gear 15 and the base of cup 2. Secured upon the upper extremity of the pivot pin, is a crank arm 22 pivotally connected to a connecting rod 23 in the usual manner, so that endwise movement imparted to rod 23 shall impart swinging movement to arm 22, for a purpose which is hereinafter explained.

A band 24, constituting a portion of a sphere, fits snugly around the outer portion of cup 2, and in order to so arrange the band, it is made up of sections bolted together as shown at 25. The band is formed with a socket 26 receiving the lower end of the pivot pin, and at a diametrically opposite point with an opening 27 through which the pivot pin extends. Near its outer margin the band is provided with an internal groove 28, containing a packing ring 29 in engagement with the outer side of the cup to establish a dust and liquid connection between the band and cup. Formed in the inner margin of the band is a groove 30 containing a packing ring 31. Also it preferably contains a series of coiled springs 32, for holding the packing ring 31 pressed against the inner face of wheel 10, to establish an oil and dust proof connection between the band and said wheel 10.

In operation power is transmitted from axle 4 to wheel 10 through the set of four gear wheels described, this application of power being unaffected by the position of the wheel, that is regardless of whether the wheel is running in a straight line or is describing a curve, the wheel and band being shown in Fig. 4 in a position which they may occupy when the wheel is describing a curve. To turn the wheel to the position shown in Fig. 4, which represents its limit of turning movement in one direction, the crank arm is swung in the direction indicated by the arrow, Fig. 1. This turns the pivot pin and segmental gear 9, and the latter through its intergeared relation with the head of the spindle, swings the latter in a horizontal plane, that is to say rocks said spindle around an imaginary vertical axis lying in the vertical plane of the gear wheel 17 secured to wheel 10, this axis being diametric with respect to said gear wheel which as wheel 10 is turned, rocks in effect, around said axis without disturbing its proper intergeared relation with the two gear wheels 16 which act as checks upon each other to maintain the four gear wheels in proper operative relation to each other, the lower gear wheel 16 operating as the check when the wheel is turned to guide the car to the right, and the upper wheel 16 as the check when wheel 10 is turned to guide the car to the left.

It will be apparent that the use of the packing strips and cap 14, guard against the leakage of oil from the various bearings and moving parts and the access of dust to said parts. It will also be apparent that through the mechanism described, the wheels will readily turn in response to the application of power on the pivots for the wheels. It will also be apparent that the invention is susceptible of modification in various particulars without departing from the principle of construction involved or sacrificing any of the advantages of the appended claims.

I claim:

1. In a combined wheel drive and guide mechanism, a driven axle, a housing therefor, a cup upon the housing into which the axle projects, a vertical pivot pin journaled in the cup beyond the end of the axle, a spindle projecting into the cup and provided with a curved slot and a horizontal series of gear teeth, a segmental gear rigid on the said pin and engaging said teeth of the spindle, a road wheel journaled on the spindle, a gear wheel on the axle, a gear wheel on the road wheel, a pair of gear wheels suitably journaled within the cup above and below the inner end of the spindle and intermeshing with both of the first-named gear wheels, and means to turn said pivot pin to cause the segmental gear to impart rocking movement to the spindle and thereby turn the road wheel without interfering with the operation of the train of gearing between the axle and the road wheel.

2. In a combined wheel drive and guide mechanism, a driven axle, a housing therefor, a cup upon the housing into which the axle projects, a vertical pivot pin journaled in the cup beyond the end of the axle, a spindle projecting into the cup and provided with a curved slot and a horizontal series of gear teeth, a segmental gear rigid on the said pin and engaging said teeth of the spindle, a road wheel journaled on the spindle, a gear wheel on the axle, a gear wheel on the road wheel, a pair of gear wheels suitably journaled within the cup above and below the inner end of the spindle and intermeshing with both of the first-named gear wheels, a crank arm secured to the pivot pin and means to swing said arm to turn the road wheel without interfering with the operations of the train of gearing connection between the axle and the road wheel.

3. In a combined wheel drive and guide mechanism, a driven axle, a housing therefor, a cup upon the housing into which the axle projects, a vertical pivot pin journaled in the cup beyond the end of the axle, a spindle projecting into the cup and provided with a curved slot and a horizontal series of gear teeth, a segmental gear rigid on the said pin and engaging said teeth of the spindle, a road wheel journaled on the spindle, a gear wheel on the axle, a gear wheel on the road wheel, a pair of gear wheels suitably journaled within the cup above and below the inner end of the spindle and intermeshing with both of the first-named gear wheels, a band rotatable with and pivoted on the cup coaxially with said pivot pin, means establishing a liquid and dust proof connection between said band and cup, means establishing a liquid and dust proof connection between said band and road wheel, and means to turn said pivot pin to cause the segmental gear to impart rocking movement to the spindle and thereby turn the road wheel without interfering with the operations of the train of gearing between the axle and the road wheel.

4. In a combined wheel drive and guide mechanism, a driven axle, a housing therefor, a cup upon the housing into which the axle projects, a vertical pivot pin journaled in the cup beyond the end of the axle, a spindle projecting into the cup and provided within the same with an enlargement or head having a curved slot enlarged at its upper end to form a recess, through which slot said pin extends; said head being formed inward of said pin with a series of internal teeth, a segmental gear rigidly mounted on said pin within said recess and meshing with said internal teeth, a road wheel suitably journaled about said spindle, a cap at the outer side of the wheel to exclude dust from the hub thereof, a beveled gear secured to the inner side of the road wheel concentrically of said spindle and occupying the same vertical plane as the center from which the curved slot and the curved teeth of the spindle head extend, a beveled gear secured on the axle within the cup, a pair of beveled gears journaled on the pivot pin and intergeared with the gear wheels on the axle and road wheel, a band mounted upon the cup, a packing ring secured to the band and engaging the cup with a liquid and dust proof relation, a packing ring carried by the band and engaging the inner side of the road wheel with a liquid and dust proof relation, a crank arm mounted on the pivot pin externally of said cup and band, and means for swinging said crank arm.

In testimony whereof, I affix my signature, in the presence of two witnesses.

RUSSELL LEE DAILEY.

Witnesses:
K. M. THORPE,
G. Y. THORPE.